(12) United States Patent
Kenny et al.

(10) Patent No.: US 7,688,192 B2
(45) Date of Patent: Mar. 30, 2010

(54) PROGRAMMING WIRELESS SENSORS

(75) Inventors: Thomas Kenny, Troy, MI (US); Ernest Pacsai, Wixom, MI (US); Robert Gilling, Caro, MI (US)

(73) Assignee: G-5 Electronics, LLC, Auburn Hill, MI (US)

( * ) Notice: Subject to any disclaimer, the term of this patent is extended or adjusted under 35 U.S.C. 154(b) by 291 days.

(21) Appl. No.: 11/601,427

(22) Filed: Nov. 17, 2006

(65) Prior Publication Data

US 2008/0117037 A1 May 22, 2008

(51) Int. Cl.
*B60C 23/00* (2006.01)
(52) U.S. Cl. ............... 340/447; 340/539.1; 340/506
(58) Field of Classification Search ......... 340/539.1, 340/539.11, 572.1, 501, 506, 442, 447; 702/34, 702/36, 182, 183; 367/58
See application file for complete search history.

(56) References Cited

U.S. PATENT DOCUMENTS

| | | | | |
|---|---|---|---|---|
| 6,671,809 | B1 | 12/2003 | Perona et al. | 713/200 |
| 6,768,901 | B1 | 7/2004 | Osborn et al. | 455/230 |
| 6,876,864 | B1 | 4/2005 | Chapin | 455/509 |
| 6,889,165 | B2 * | 5/2005 | Lind et al. | 702/183 |
| 6,904,796 | B2 | 6/2005 | Pacsai et al. | 73/146.8 |
| 6,920,785 | B2 | 7/2005 | Toyofuku | |
| 6,931,074 | B1 | 8/2005 | Palermo et al. | 375/259 |
| 6,972,672 | B2 | 12/2005 | Desai | 340/444 |
| 6,982,653 | B2 | 1/2006 | Voeller et al. | |
| 6,989,741 | B2 | 1/2006 | Kenny et al. | 340/505 |
| 7,003,332 | B2 | 2/2006 | Linn | 455/574 |
| 7,027,736 | B1 * | 4/2006 | Mier-Langner et al. | 398/106 |
| 7,034,672 | B2 | 4/2006 | Dinello et al. | 340/447 |
| 7,081,693 | B2 | 7/2006 | Hamel et al. | 307/151 |
| 7,095,316 | B2 | 8/2006 | Kachouh et al. | 340/442 |
| 7,277,822 | B2 * | 10/2007 | Blemel | 702/183 |
| 7,518,495 | B2 | 4/2009 | Tang et al. | |
| 2005/0068161 | A1 | 3/2005 | Ichinose et al. | 340/445 |
| 2006/0030318 | A1 | 2/2006 | Moore et al. | |

(Continued)

OTHER PUBLICATIONS

S.W. Arms. C.P. Townsend, D.L. Churchill, M.J. Hamel, J.H. Galbreath, S.W. Mundell, MicroStrain, Inc., 310 Hurricane Lane, Unit 4, Williston, Vermont 05495 USA, "Frequency Agile Wireless Sensor Network", Microstrain.com Copyright 2004, Society of Photo-Optical Instrumentation Engineers, 8 pages.

(Continued)

*Primary Examiner*—Van T. Trieu
(74) *Attorney, Agent, or Firm*—IP Law, LLC; Stanley K. Hill

(57) ABSTRACT

Programmable wireless sensors are provided. Particular programmable wireless sensors comprise a power supply, a sensing component, a transmitting component adapted to transmit information obtained by the sensing device or information derived from information obtained by the sensing component, a receiving component adapted to receive software, a memory component adapted to store received software, and control logic. The control logic includes logic operable to execute stored software. The stored software, when executed, is operable to program at least one operating characteristic of the programmable wireless sensor. Also provided are systems useful in selecting software to program or reprogram programmable wireless sensors. The programmable wireless sensors may be programmed or reprogrammed to emulate conventional wireless sensors, such as conventional TPMS sensors.

21 Claims, 3 Drawing Sheets

U.S. PATENT DOCUMENTS

| | | | |
|---|---|---|---|
| 2006/0074554 A1 | 4/2006 | Ho | 701/213 |
| 2006/0144132 A1 | 7/2006 | Shimura | 73/146 |
| 2006/0220805 A1 | 10/2006 | Thomas et al. | |
| 2006/0253217 A1 | 11/2006 | Moulds et al. | |
| 2007/0286022 A1* | 12/2007 | Bull et al. | 367/58 |

OTHER PUBLICATIONS

PCT/US07/83354, International Search Report mailed Apr. 8, 2008, 9 pages.

PCT/US07/83354, International Preliminary Report on Patentability issued May 19, 2009, 6 pages.

* cited by examiner

PROGRAMMING WIRELESS SENSORS

FIELD OF THE INVENTION

The present invention relates generally to wireless sensors. More particularly, the present invention relates to wireless sensors having programmable operating characteristics.

BACKGROUND OF THE INVENTION

Tire-Pressure-Monitoring Systems ("TPMSs") are known in the auto industry. Such systems typically include a plurality of TPMS sensors associated with the tires or wheels of a vehicle, such as an automobile, truck, or other wheeled vehicle. The TPMS sensors include a sensing component for sensing (e.g., measuring, detecting, or determining) at least one tire condition including tire pressure. The TPMS sensors also include a transmitting component that transmits information (e.g., tire pressure) obtained by the sensing component. The transmitting component transmits the information to a TPMS receiver on the vehicle, which may display the information to an operator of the vehicle. In this manner, the operator of a vehicle can be provided with information warning of improper tire conditions. The transmitting component typically transmits the information to the receiver wirelessly via radio-frequency ("RF") signals in accordance with the transmitting component's operating characteristics. Operating characteristics of a TPMS sensor's components are part of the overall operating characteristics of the TPMS sensor that define the TPMS sensor's functionality. For example, operating characteristics of the transmitting component may include a transmission frequency, a type of modulation, and a transmission power-level, for example.

BRIEF DESCRIPTION OF THE DRAWINGS

Objects, features, and advantages of embodiments disclosed herein may be better understood by referring to the following description in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

DESCRIPTION

Overview

Figure 1:
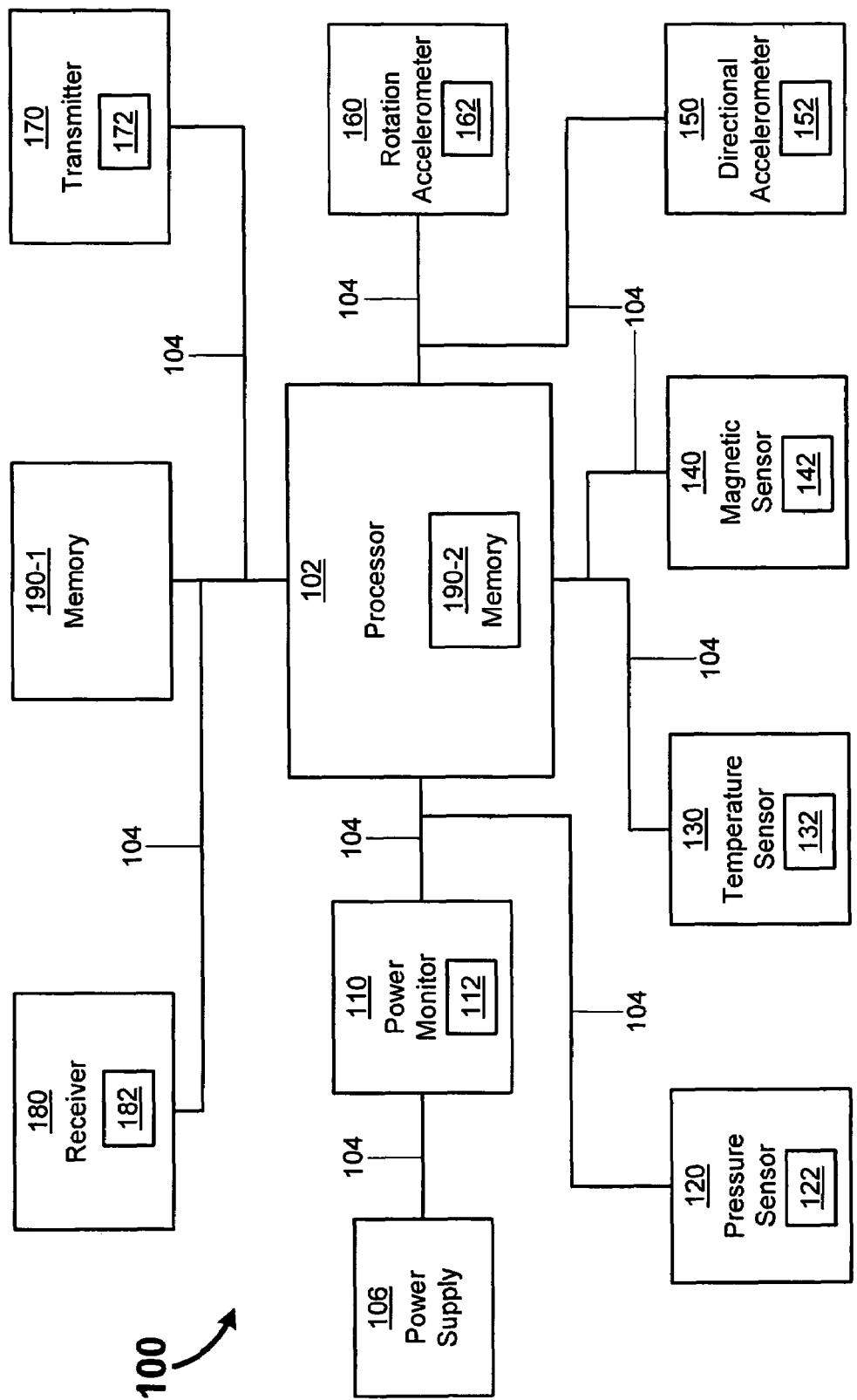
FIG. 1 is a block diagram illustrating a programmable wireless sensor in accordance with embodiments disclosed herein.

Conventional TPMSs are produced by a plurality of manufacturers. TPMSs produced by different manufacturers generally having different operating characteristics. For example, TPMSs produced by different manufacturers may have different operating characteristics for transmitting data between a TPMS sensor and the TPMS sensor's corresponding TPMS receiver. That is, TPMS sensors produced by different manufacturers may transmit information to corresponding TPMS receivers at different frequencies, different modulations, and at different power-levels.

Automobile manufacturers naturally provide a new vehicle with a TPMS sensor and a TPMS receiver that use compatible operating characteristics, allowing the TPMS sensor to communicate with the TPMS receiver. That is, if a manufacturer builds a TPMS receiver to receive information at a particular frequency and modulation, for example, then the manufacturer will also build the corresponding TPMS transmitter to transmit the information at the same frequency and modulation.

However, in the automobile aftermarket, an owner of a vehicle may replace the vehicle's wheels or tires with new wheels or tires, such as custom wheels, for example. In order for the supplier of the new wheels/tires to ensure a working TPMS, the supplier must match the TPMS sensors in the new wheels/tires with the existing TPMS receiver. That is, the supplier must provide new wheels/tires with TPMS sensors that are compatible with the existing TPMS receiver on the vehicle. To be able to provide TPMS sensors that are compatible with the TPMS receivers of different manufactures, the supplier must keep a large number of different TPMS sensors in inventory. That is, suppliers that provide wheels/tires in the aftermarket must keep an inventory on hand that contains TPMS sensors matching the operating characteristics used by the TPMS receiver for each vehicle on which the supplier wishes to install wheels/tires. If the supplier does not have in inventory a TPMS sensor matching the operating characteristics of the vehicle on which the wheels/tires are to be installed, then the vehicle owner must either forgo the purchase and seek an alternate supplier or the vehicle owner will have an improperly-functioning TPMS installed.

Techniques and apparatus discussed herein deviate with respect to and improve upon conventional technology such as discussed above and other techniques and apparatus also known in the prior art. In disclosed embodiments, programmable wireless sensors are disclosed that may be programmed (or reprogrammed) to emulate existing conventional wireless sensors that are not re-programmable. For example, in accordance with disclosed embodiments, a supplier of custom wheels/tires may provide a vehicle with custom wheels/tires containing programmable wireless sensors. The supplier may program the programmable wireless sensors to emulate the conventional TPMS sensors on the wheels/tires that the supplier is replacing. In this manner, the supplier can program the programmable wireless sensors to have operating characteristics sufficiently similar to the replaced conventional TPMS sensors to make the programmable wireless sensors substantially compatible with the TPMS receiver on the vehicle. Programmable wireless sensors disclosed herein are capable of being re-programmed. That is, once a programmable wireless sensor has been programmed as described above, it can be re-programmed to emulate a different conventional TPMS sensor. As long as the programmable wireless sensor is operating correctly, it can be re-programmed any number of times.

A first embodiment discloses a programmable wireless sensor comprising a power supply; a sensing component; a transmitting component adapted to transmit information wirelessly, including information obtained by the sensing component or information derived from information obtained by the sensing component; a receiving component adapted to receive software; a memory component adapted to store received software; and control logic. In addition to providing functionality found in conventional TPMS sensors, such as electronic connection between the components, the control logic includes logic operable to execute stored software. The stored software, when executed, is operable to program at least one operating characteristic of the programmable wireless sensor. In particular embodiments, programmable wireless sensors can be used as TPMS sensors. By transmitting appropriate software to the programmable sensor, a user (e.g., a supplier of wheels/tires) can program or reprogram a programmable wireless sensor to emulate a particular TPMS sensor.

A second embodiment discloses software encoded in one or more computer-readable media and, when executed, operable to program at least one operating characteristic of disclosed programmable wireless sensors. In particular embodiments the software may be embodied in programmable wireless sensors, devices adapted to transmit the software to programmable wireless sensors, or in computer systems useful for storing the software for later retrieval when needed.

A third embodiment discloses a computer system comprising a processor; a memory component that stores instructions associated with an application executed by the processor; and an interconnect coupling the processor and the memory component, enabling the computer system to execute the application. Upon execution of the application, the computer system is enabled to perform operations of: receiving input related to wireless sensors; and responding to the input. In response to the input, the computer system is enabled to select software encoded in one or more computer-readable media and, when executed, operable to program at least one operating characteristic of a programmable wireless sensor. In particular embodiments, the computer system is further enabled to transfer the selected software to a device adapted to transmit the selected software to the programmable wireless sensor. In particular embodiments, the computer system is further enabled to transmit (e.g., wirelessly) the selected software to the programmable wireless sensor.

It is to be understood that the inventive matter disclosed herein may be embodied strictly as a software program, as software and hardware, or as hardware alone. The features disclosed herein may be employed in programmable wireless sensors as well as other computerized devices and systems.

Description of Example Embodiments

A first embodiment discloses a programmable wireless sensor comprising a power supply; a sensing component; a transmitting component adapted to transmit information wirelessly, including information obtained by the sensing component or information derived from information obtained by the sensing component; a receiving component adapted to receive software; a memory component adapted to store received software; and control logic. In addition to providing functionality found in conventional TPMS sensors, such as electronic connection between the components, the control logic also includes logic operable to execute stored software. The stored software, when executed, is operable to program at least one operating characteristic of the programmable wireless sensor.

FIG. 1 is a block diagram illustrating a programmable wireless sensor 100 in accordance with embodiments disclosed herein. The programmable wireless sensor 100 includes a power supply 106. The power supply 106 provides electrical power for use by the various components of the programmable wireless sensor 100. The power supply 106 may include a rechargeable battery. In particular embodiments, energy from wireless signals received by the receiver 180 may be used to recharge a rechargeable battery, thereby prolonging the life of the power supply 106.

The programmable wireless sensor 100 includes a receiving component adapted to receive software. The receiving component may receive software wirelessly and/or non-wirelessly (e.g., via a USB port). The receiving component in FIG. 1 comprises a receiver 180 including control logic 182. The receiver 180 receives the software and the programmable wireless sensor 100 stores the software in its memory component. As described in embodiments disclosed herein, the software, when executed, is operable to program at least one operating characteristic of the programmable wireless sensor 100.

In particular embodiments, the receiving component is a programmable component and receives software that, when executed, is operable to program at least one operating characteristic of the programmable wireless sensor's 100 receiving component. That is, a receiving component may be a programmable component. In particular embodiments, the receiving component is a programmable component having at least one programmable operating characteristic selected from the group consisting of frequency, modulation, gain, sensitivity, and on/off status.

For example, a user of the programmable wireless sensor 100 may desire to program the receiving component to emulate or model a receiver of a particular conventional TPMS sensor. Manufacturers of conventional TPMSs build TPMS sensors that are activated by wireless signals. Wireless signals having a frequency of less than about 30 MHz are typically referred to as low frequency ("LF") signals and wireless signals having a frequency greater than about 30 MHz are typically referred to as radio-frequency ("RF") signals. Different manufacturers build conventional TPMSs that are activated by receiving different kinds of wireless signals. For example, a first manufacturer may build a TPMS sensor having a receiver that receives a continuous-wave LF signal and a second manufacturer may build a TPMS sensor having a receiver that receives a continuous-wave RF signal. The particular frequency that a manufacturer builds a receiver to receive is an operating characteristic of that receiver and, therefore, is an operating characteristic of any TPMS sensor containing that receiver. Thus, if the receiver in a particular conventional TPMS sensor is designed to receive RF signals at a frequency of 315 MHz, for example, a user of the programmable wireless sensor 100, wishing to emulate this particular conventional TPMS sensor may transmit software to the programmable wireless sensor 100 that, when executed, programs the receiver 180 to receive RF signals at 315 MHz.

Similarly, a first manufacturer may build a TPMS sensor having a receiver that receives a modulated LF signal and a second manufacturer may build a TPMS sensor having a receiver that receives a non-modulated LF signal. Thus, the type of modulation of signals that a manufacturer builds a receiver to receive is an operating characteristic of that receiver and, therefore, is an operating characteristic of any TPMS sensor containing that receiver. There exist different types of digital modulation that are well known in the art of wireless transmitting. These types of modulation may include, for example, no modulation, amplitude-shift-keying ("ASK"), frequency-shift-keying ("FSK"), or phase-shift-keying ("PSK"). Thus, if the receiver in a particular conventional TPMS sensor is designed to receive LF signals modulated using an ASK modulation, for example, a user of the programmable wireless sensor 100, wishing to emulate this particular conventional TPMS sensor may transmit software to the programmable wireless sensor 100 that, when executed, programs the receiver 180 to receive LF signals modulated using an ASK modulation.

Additionally, a user of the programmable wireless sensor 100 may transmit software to the programmable wireless sensor 100 that, when executed, programs the sensitivity of the receiver 180. In a programmable wireless sensor 100 programmed to emulate a conventional TPMS sensor, the receiver 180 will typically be programmed to have a sensitivity of from about 1 mV to about 20 mV. Similarly, a user of the programmable wireless sensor 100 may transmit software to the programmable wireless sensor 100 that, when executed, programs the gain of the receiver 180.

Programmable receiving components may be programmed "off" to conserve power. Thus, the on/off status of a receiving component is an operating characteristic that may be programmed. The programmable wireless sensor 100 may be turned on periodically for short durations to allow polling of wireless signals. If the receiving component detects a wireless signal during one of these periodic short durations, the receiving component can be programmed "on" to receive the signal.

A programmable wireless sensor in accordance with embodiments disclosed herein may include a plurality of programmable receiving components. For example, one programmable receiving component may be programmed to receive continuous-wave LF signals at a particular frequency and a second programmable receiving component may be programmed to receive modulated RF signals at a different frequency. In particular embodiments, the receiving component may include a receiver that is not wireless, such as a USB port, for example. In these embodiments, the non-wireless receiver can receive software to initially program the programmable wireless sensor. Once programmed, a supplier can install the programmable wireless sensor in a wheel. After the initial programming and installation, the receiving component may shut off any power used for the non wireless receiver and receive future software transmissions for reprogramming via a wireless receiver.

In addition to receiving software, receiving components in particular embodiments of programmable wireless sensors may receive wireless signals that may be used to activate the programmable wireless sensor. Receiving signals for activating TPMS sensors is known in the art and is described, for example, in U.S. Pat. No. 6,904,796 issued to Pacsai et al. Thus, programmable wireless sensors that emulate TPMS sensors can be activated in the same manner that conventional TPMS sensors are activated. Signals used to activate programmable wireless sensors may be referred to as activation signals.

In operation, the programmable wireless sensor 100 receives software at the receiver 180 and stores the received software in a memory component. A programmable wireless sensor's memory component may comprises a plurality of memory modules or memory devices. For example, the programmable wireless sensor 100 in FIG. 1 comprises a memory device 190-1 and the processor 102 also comprises a memory device 190-2. These memory devices 190-1, 190-2 are part of the programmable wireless sensor's 100 memory component. In addition, other components of the programmable wireless sensor 100 may comprise memory devices that are part of the memory component. For example, the receiver 180 comprises control logic 182 that may comprise a memory device much the same way that the processor 102 comprises a memory device 190-2. Thus, in particular embodiments, a programmable wireless sensor may distribute received software to a plurality of components in the programmable wireless sensor. For example, the programmable wireless sensor 100 may store software that is less frequently executed in the memory device 190-1 and may store software that is frequently executed on the processor 102 in the memory device 190-2. Additionally, the programmable wireless sensor 100 may store software that is specific to a particular component with control logic contained in that particular component. For example, the programmable wireless sensor 100 may store software that programs operating characteristics of its receiving component with the control logic 182 of the receiver 180.

Embodiments of programmable wireless sensors disclosed herein may advantageously use conventional memory devices known to be effective for storing software. For example, memory components in embodiments of programmable wireless sensors disclosed herein may advantageously use random access memory ("RAM") or flash memory to store received software.

Programmable wireless sensors comprise control logic including control logic operable to execute stored software. The stored software, when executed, is operable to program at least one operating characteristic of the programmable wireless sensor. For example, a programmable wireless sensor may comprise, as discussed above, a programmable receiving component that the software is operable to program. In programming a programmable receiving component, the software may program operating characteristics of the programmable wireless sensor, such as frequency of received signals, modulation of received signals, sensitivity of the receiving component, and on/off status of the receiving component. In particular embodiments described herein, programmable wireless sensors may execute received software to program operating characteristics of other programmable components.

As is known in the computing arts, logic operable to execute stored software may comprise hardware such as microprocessors, microcontrollers, application-specific integrated circuits ("ASICs"), and programmable logic arrays ("PLAs"), for example. As is also known in the computing arts, logic operable to execute received software may comprise other software such as firmware, for example. Thus, in particular embodiments, the control logic in programmable wireless sensor may comprise both hardware and software. The control logic may also include electronic interconnects, such as the electronic interconnects 104 shown in FIG. 1. The electronic interconnects 104 provide for electronic communication between various components in the programmable wireless sensor 100. For example, the programmable wireless sensor 100 may use the electronic interconnects to transfer software received by the receiver 180 to other components such as the processor 102 and the memory device 190-1. Embodiments of programmable wireless sensors disclosed herein may advantageously use conventional interconnects known in the art to be effective for providing electronic communication between electronic components.

A programmable wireless sensor in accordance with embodiments disclosed herein includes a sensing component. The sensing component includes at least one sensing device and may include a plurality of sensing devices. In particular embodiments, a programmable wireless sensor comprises at least one sensing device selected from the group consisting of a pressure sensor, a temperature sensor, a magnetic sensor, a power monitor, a rotational accelerometer, and a directional accelerometer.

The sensing component of the programmable wireless sensor 100 includes a pressure sensor 120. In particular embodiments, the pressure sensor 120 may be a conventional pressure sensor, such as a pressure sensor used in conventional TPMS sensors. In other particular embodiments, the pressure sensor 120 may be a programmable pressure sensor. For example, conventional TPMS sensors generally have pressure sensors designed to measure from about 0 psi to about 120 psi. Tires of automobiles, such as passenger automobiles, typically have a pressure from about 0 psi to about 60 psi and the pressure in truck tires typically ranges from about 0 psi to about 120 psi. Programmable wireless sensors in accordance with embodiments disclosed herein may include a programmable pressure sensor having a programmable gain. That is, the gain of the programmable pressure sensor may be an operating characteristic that can be programmed by software executing on the programmable wireless sensor. In programmable wireless sensors used to emulate TPMS sensors, the programmable gain may be programmed, for example, to select a pressure sensor gain that is optimal for use with automobiles or programmed to select a pressure sensor gain that is optimal for use with trucks. The pressure sensor 120 may have at least one programmable operating characteristic selected from the group consisting of a threshold pressure, a gain, a sensitivity, and an on/off status. The at least one programmable operating characteristic may be programmed by software executed, for example, by the processor 102 or executed by the pressure sensor's control logic 122.

The sensing component of the programmable wireless sensor 100 includes a temperature sensor 130. In particular embodiments, the temperature sensor 130 may be a conventional temperature sensor such as a temperature sensor used in conventional TPMS sensors. In other particular embodiments, the temperature sensor 130 may be a programmable temperature sensor. For example, the temperature sensor 130 may have a programmable threshold temperature. That is, the threshold temperature of the programmable temperature sensor 130 may be an operating characteristic that can be programmed by software executed, for example, by the processor 102 or executed by the temperature sensor's control logic 132. A threshold temperature may be programmed to a particular temperature depending on the application of the programmable wireless sensor 100. That is, different applications may require different threshold temperatures. In this manner, the programmable wireless sensor 100 may be programmed to transmit a warning if a temperature detected by the temperature sensor 130 is either above a temperature threshold or below a temperature threshold. For example, the programmable wireless sensor 100 may transmit a warning if a temperature detected by the temperature sensor 130 is greater than a programmed threshold temperature. In a different application, the programmable wireless sensor 100 may transmit a warning if a temperature detected by the temperature sensor 130 is below a programmed threshold temperature.

In particular embodiments, the temperature sensor 130 may also be a programmable temperature sensor that can be programmed "off" to conserve power. Thus, the on/off status of a temperature sensor may be an operating characteristic that may be programmed by software executed, for example, by the processor 102 or executed by the temperature sensor's control logic 132. Programming the temperature sensor 130 to "off" can be advantageous when the programmable wireless sensor 100 is used in an application that does not require a temperature sensor. The temperature sensor 130 may have at least one programmable operating characteristic selected from the group consisting of a threshold temperature, a gain, a sensitivity, and an on/off status. The at least one programmable operating characteristic may be programmed by software executed, for example, by the processor 102 or executed by the pressure sensor's control logic 132.

The sensing component of the programmable wireless sensor 100 includes a magnetic sensor 140. In particular embodiments, the magnetic sensor 140 may be a conventional magnetic sensor, such as a magnetic sensor used in conventional TPMS sensors. In other particular embodiments, the magnetic sensor 140 may be a programmable magnetic sensor. For example, the magnetic sensor 140 may have a programmable on/off status, allowing the programmable wireless sensor 100 to program the magnetic sensor "off" to conserve power in applications that do not need a magnetic sensor. Other programmable operating characteristics of the magnetic sensor 140 may include gain, sensitivity, and a threshold level of magnetic field. Thus, the magnetic sensor 140 may have at least one programmable operating characteristic. The programmable operating characteristic may be programmed by software executed, for example, by the processor 102 or executed by the magnetic sensor's control logic 142.

The sensing component of the programmable wireless sensor 100 includes a power monitor 110. The power monitor 110 may monitor the power level in the power supply 106. For example, if the power supply 106 is a battery, the power monitor 110 may monitor the state of charge (e.g., the voltage or current level) in the battery. When the power level in the power supply 106 drops below a threshold power level, the programmable wireless sensor 100 may transmit a warning. In particular embodiments, the power monitor 110 may be programmable. For example, the power monitor 110 may have at least one programmable operating characteristic selected from the group consisting of a threshold power level, a voltage, a current, and an on/off status. The at least one programmable operating characteristic may be programmed by software executed, for example, by the processor 102 or executed by the power monitor's control logic 112.

The sensing component of the programmable wireless sensor 100 includes a directional accelerometer 150. Direction accelerometers are generally used to detect the direction of acceleration and deceleration of the programmable wireless sensor 100. In applications where the programmable wireless sensor 100 is used to emulate a conventional TPMS sensor, the programmable wireless sensor 100 may use the directional accelerometer 150 to determine on which side of a vehicle the tire containing the programmable wireless sensor 100 is located. The directional accelerometer 150 may have at least one programmable operating characteristic selected from the group consisting of a threshold acceleration, gain, sensitivity, and an on/off status. The at least one programmable operating characteristic may be programmed by software executed, for example, by the processor 102 or executed by the directional accelerometer's control logic 152.

The sensing component of the programmable wireless sensor 100 includes a rotational accelerometer 160. The programmable wireless sensor 100 may use the rotational accelerometer 160 to measure the speed of rotation of the programmable wireless sensor 100. The speed threshold may be a programmable operating characteristic. The rotational accelerometer 160 may also have an on/off status that is a programmable operating characteristic. The rotational accelerometer 160 may have at least one programmable operating characteristic selected from the group consisting of a threshold speed, gain, sensitivity, and an on/off status. The programmable operating characteristic may be programmed by software executed, for example, by the processor 102 or executed by the rotational accelerometer's control logic 162.

It should be noted that a sensing component sensing a condition exceeding a threshold value may not only cause information related to a sensed condition to be transmitted it may also cause a reprogramming of a different operating characteristic elsewhere in the programmable wireless sensor 100. For example, the programmable wireless sensor 100 may reprogram some other operational characteristic if it measures a speed exceeding a predetermined threshold value.

A programmable wireless sensor in accordance with embodiments disclosed herein includes a transmitting component. The transmitting component is adapted to transmit information wirelessly from the programmable wireless sensor to a receiver. For example, in a programmable wireless sensor emulating a TPMS sensor will transmit information about the wheel/tire to a receiver in the vehicle to which the wheel/tire is attached. A programmable wireless sensor may transmit information obtained by the sensing component (e.g., a pressure, a temperature, a power level, etc.) or information derived from information obtained by the sensing component. Information derived from information obtained by the sensing component may include, for example, a warning that the power level has dropped below a threshold power level, a warning that a measured pressure is below some threshold value, a warning that a measured temperature is above some threshold value, or an indication of the side of a vehicle on which the programmable wireless sensor is located.

The programmable wireless sensor 100 comprises a transmitter 170 including control logic 172. In particular embodiments, the transmitter 170 may be a conventional transmitter. For example, a in programmable wireless sensor emulating a TPMS sensor, the transmitter 170 may be the same transmitter used in the emulated TPMS sensor. In these embodiments, the transmitter's control logic 172 may comprise the same control logic found in transmitters of conventional TPMS sensors. Thus, the control logic 172 may provide electronic communication necessary for the transmitter to communicate electronically with other components of the programmable wireless sensor 100.

In other particular embodiments, the transmitter 170 may be a programmable transmitter. Thus, the transmitter 170 may have at least one programmable operating characteristic. The programmable operating characteristic may be programmed by software executed, for example, by the processor 102 or executed by the transmitter's control logic 172. Thus, the transmitter's control logic 172 may include logic operable to execute stored software that, when executed, is operable to program at least one operating characteristic of the transmitter 170. In particular embodiments, the transmitting component of the programmable wireless sensor 100 is a programmable component having at least one programmable operating characteristic selected from the group consisting of amplitude, frequency, phase, modulation, and transmit power.

In embodiments wherein the transmitter 170 is a programmable component, software executing on the programmable wireless sensor 100 may program the transmitter 170 to emulate conventional transmitters. For example, in particular embodiments, the programmable wireless sensor 100 may emulate a conventional TPMS sensor. In these embodiments, the software may program the frequency, amplitude, phase, modulation, and transmit power, allowing the transmitter 170 to transmit signals that are compatible with signals the conventional TPMS sensor transmits. In this manner, a TPMS receiver designed to receive signals from the conventional TPMS sensor can also receive signals from the programmable wireless sensor 100 emulating the TPMS sensor. In applications when the programmable wireless sensor 100 is emulating a conventional TPMS sensor, a programmable transmitter 170 will typically be programmed at a frequency from about 300 MHz to about 950 MHz. Also in these applications, the software will typically program output power of the transmitter 170 to be from about −40 dBm to about +10 dBm.

Programmable wireless sensors include control logic that generally controls the operation of the programmable wireless sensor. This control logic includes control logic operable to execute software stored in the memory component of the programmable wireless sensor. Components of programmable wireless sensors, as described in reference to embodiments disclosed herein, that include at least one programmable device such as a programmable receiver or a programmable transmitter, for example, are referred to herein as a programmable components. In particular embodiments, programmable wireless sensors will include at least one programmable component and will be capable of receiving, storing, and executing software that, when executed, is operable to program at least one operating characteristic of the programmable component(s).

Aspects of the control logic may be implemented in hardware and other aspects may be implemented in software. The control logic may include, for example, one or more microcontrollers, microprocessors, ASICs, PLAs, programmable amplifiers, programmable filters, programmable frequency generators, programmable antenna matching, or other circuitry. One of ordinary skill in the electronic arts should be able to implement the control logic without undue experimentation.

Software for execution on a programmable wireless sensor may be encoded in one or more computer-readable media. For example, the software may be encode on, or stored in, one or more memory devices in the memory component of a programmable wireless sensor. The software may also be encoded on other computer-readable media such as CD-ROMs, DVDS, and computer hard drives.

One of ordinary skill in the art of computer programming may produce the software in a manner known in the art of computer programming. Once the software is created, the programmer can store the software on one or more computer-readable media until it is needed. A programmer may create different versions of the software to be used in different applications. For example, a programmer may create a first version of software that when transmitted to the programmable wireless sensor 100 programs the programmable wireless sensor 100 to emulate a particular conventional TPMS sensor designed by a first manufacturer. A programmer may also create a second version of software that when transmitted to the programmable wireless sensor 100 programs the programmable wireless sensor 100 to emulate a different particular conventional TPMS sensor manufactured by a second manufacturer. In this manner, programmers of the programmable wireless sensor 100 may create a collection or library of software routines, modules, or programs, etc. that can be transmitted to the programmable wireless sensor 100 to program or reprogram it to emulate any one of a number of conventional TPMS sensors. A supplier of the programmable wireless sensor 100 or a supplier of a wheel/tire containing the programmable wireless sensor 100 may select software from the software collection to transmit to the programmable wireless sensor 100.

Figure 2:
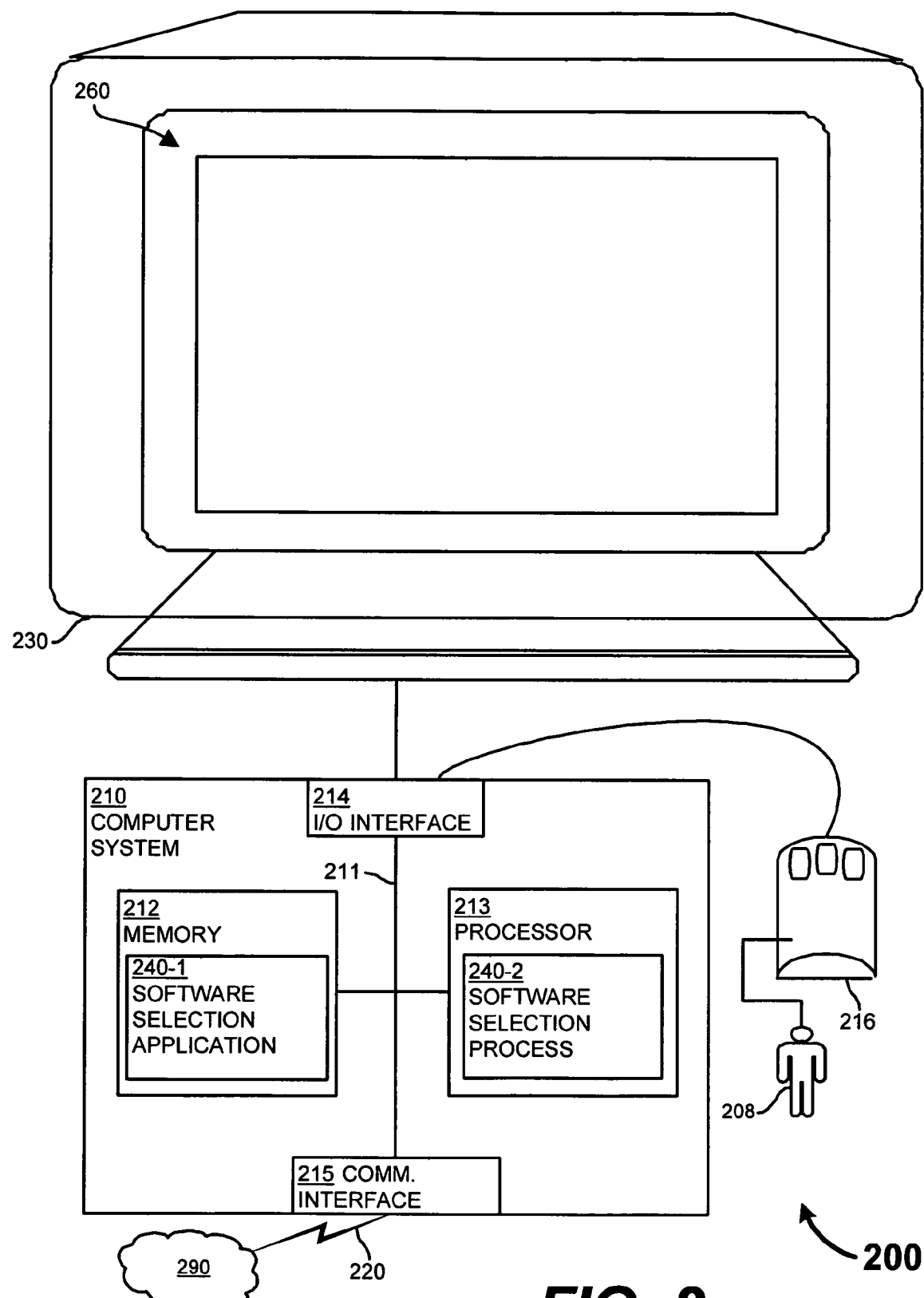
FIG. 2 is a block diagram of a computer environment illustrating an example architecture of a respective computer system useful for implementing a software-selection application according to embodiments disclosed herein.

FIG. 2 is a block diagram of a computer environment 200 illustrating an example architecture of a respective computer system 210 useful for implementing a software-selection application 240-1 according to embodiments disclosed herein. Computer system 210 can be a computerized device such as a personal computer, workstation, portable (e.g., handheld) computing device, console, network terminal, processing device, etc. As shown, computer system 210 of the present example includes an interconnect 211, such as a data bus or other circuitry, that couples a memory component 212, a processor 213, I/O interface 214, and a communications interface 215. An input device 216 (e.g., one or more user/developer-controlled devices such as a keyboard, mouse, touchpad, trackball, etc.) couples to the processor 213 through the I/O interface 214 and enables a user 208, such as a supplier of programmable wireless sensors, to provide input commands and generally interact with the graphical user interface 260 that the software-selection application 240-1 and the software-selection process 240-2 provide on a display 230. I/O interface 214 potentially provides connectivity to peripheral devices such as the input device 216, display screen 230, etc. Communications interface 215 enables computer system 210 to communicate with network 290 over the communication link 220 to retrieve and transmit information from remotely located sources if necessary.

As shown, memory component 212 can be any type of computer-readable medium and, in this example, is encoded with software-selection application 240-1 that supports functionality as herein described. Software-selection application 240-1 can be embodied as computer software code such as data and/or logic instructions (e.g., code stored in the memory component 212 or on another computer-readable medium such as a disk) that supports processing functionality according to different embodiments described herein. During operation of the computer system 210, processor 213 accesses the memory component 212 via the interconnect 211 in order to launch, run, execute, interpret, or otherwise perform the logic instructions of the software-selection application 240-1. Execution of the software-selection application 240-1 produces processing functionality in a software-selection process 240-2. In other words, the software-selection process 240-2 represents one or more portions of the software-selection application 240-1 performing within or upon the processor 213 in the computer system 210. Those skilled in the art will understand that the computer system 210 can include other processes and/or software and hardware components, such as an operating system that controls allocation and use of hardware resources.

It should be noted that, in addition to the software-selection process 240-2 that carries out method operations as discussed herein, other embodiments herein include the software-selection application 240-1 itself (i.e., the un-executed or non-performing logic instructions and/or data). The software-selection application 240-1 may be stored on one or more computer-readable media such as floppy disks, hard disks, or in optical media. According to other embodiments, the software-selection application 240-1 can also be stored in a memory type system such as in firmware, read only memory (ROM), or, as in this example, as executable code within the memory component 212 (e.g., within RAM or flash memory). Thus, it should be understood that embodiments disclosed herein include logic encoded in one or more tangible media for execution and when executed is operable to perform methods and processes disclosed herein.

Figure 3:
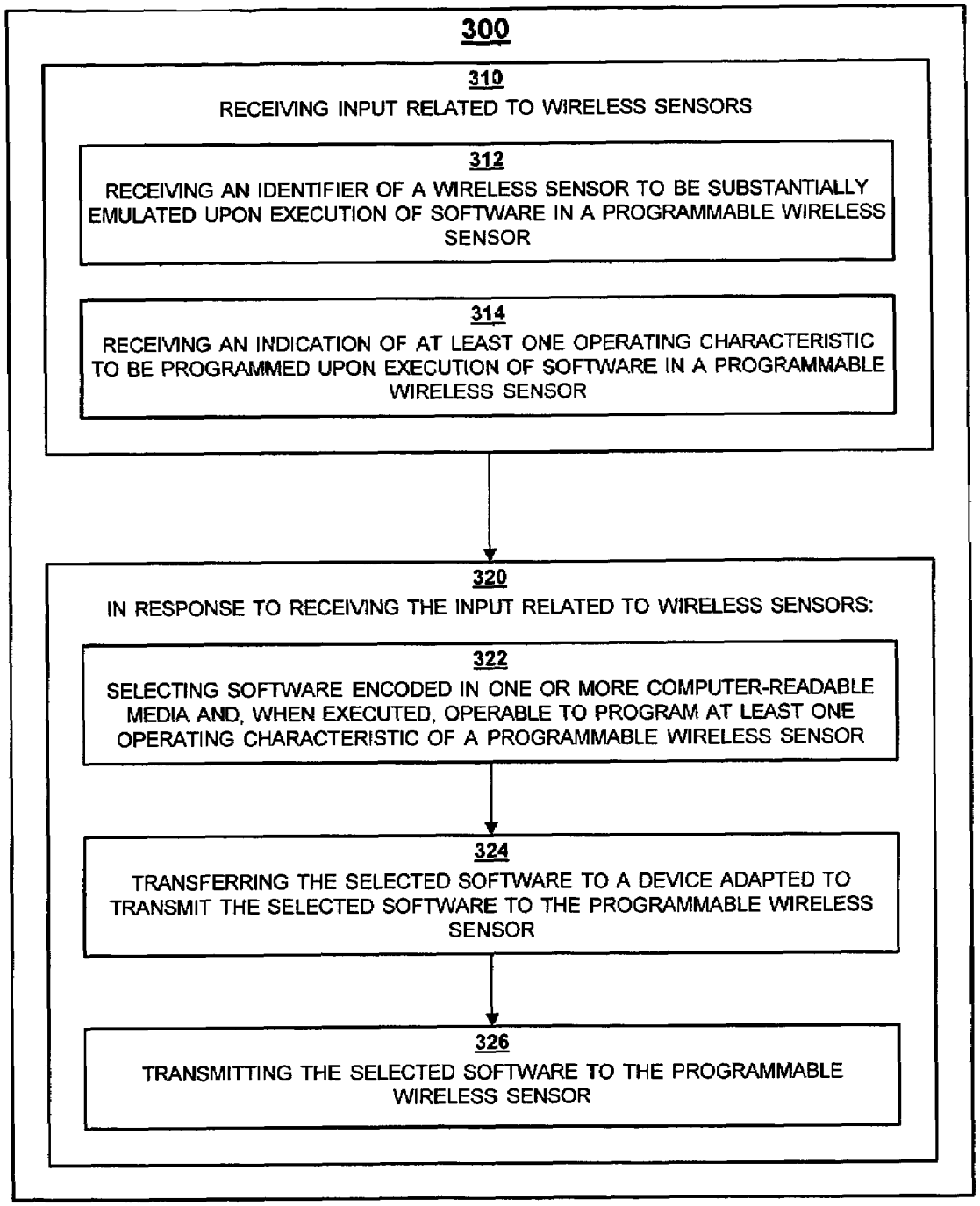
FIG. 3 illustrates procedures performable by software-selection processes in accordance with embodiments disclosed herein.

Functionality supported by computer system 210 and, more particularly, functionality associated with software-selection application 240-1 and software-selection process 140-2 is herein discussed in relation to FIG. 3. For purposes of the following discussion, computer system 210 generally performs procedures in the flowcharts illustrated in FIG. 3. However, other systems can be configured to provide similar functionality.

FIG. 3 illustrates procedures 300 performable by software-selection process 240-2 in accordance with embodiments disclosed herein. In step 310, the software-selection process 240-2 receives input related to wireless sensors. The software-selection process 240-2 can use this received input to determine at least one of the operating characteristics of a programmable wireless sensor to be programmed by the selected software. For example, the software-selection process 240-2 may use the received input to select software routines that program the frequency and modulation of both the signals received by and transmitted from the programmable wireless sensor 100.

In particular embodiments, the software-selection process 240-2 may perform step 312. In step 312, the software-selection process 240-2 receives an identifier of a wireless sensor to be substantially emulated upon execution, in a programmable wireless sensor, of selected software. The identifier may be, for example, a manufacturer's model number for a particular conventional TPMS sensor. The identifier may also be, for example, an identifier created by the software-selection process 240-2 usable to identify software previously selected for a particular application. This identifier may look something like Hi-Temp-Hi-Pressure-Chem-App-17, for example. Thus, if a user 208 of computing environment 200 selects software to program programmable wireless sensor 100 for use in a particular chemical engineering application (i.e., Chem-App-17) to transmit a warning if a threshold high temperature or a threshold high pressure is exceeded, the user 208 may provide input instructing the software-selection process 240-2 to associate the selected software with the identifier Hi-Temp-Hi-Pressure-Chem-App-17. In this manner, a user 208 using the computing environment 200 at a later point in time may select the same software simply by inputting the identifier Hi-Temp-Hi-Pressure-Chem-App-17.

In particular embodiments, the software-selection process 240-2 may perform step 314. In step 314, the software-selection process 240-2 receives an indication of at least one operating characteristic to be programmed upon execution, in a programmable wireless sensor, of selected software. The indication may be, for example, a particular transmission frequency (e.g., 433 MHz) and a particular transmission modulation (e.g., ASK). Upon receiving the indication of at least one operating characteristic to be programmed, the software-selection process 240-2 may produce a list of software selections that comply with the received indication. By comply, it is meant the software, when executed, will program the operating characteristic(s) in a programmable wireless sensor. A user 208, may then provide input to choose one of the selections in the list.

Thus, a user 208 may input, for example, a set of desired operating characteristics such as a desired frequency and modulation for both the receiver 180 and transmitter 170 of programmable wireless sensor 100. The software-selection process 240-2 receives this input and can use this input to select software that when executed on the programmable wireless sensor 100 programs the receiver 180 and the transmitter 170 to operate using the desired frequencies and modulations. Similarly, a user 208 may input a threshold high temperature, a threshold high pressure, and a format for a warning signal to be transmitted if either the threshold high temperature or the threshold high pressure is exceeded. The software-selection process 240-2 may then select the software described above in relation to chemical engineering application Chem-App-17 and the user can instruct the software-selection process 240-2 to associate the identifier Hi-Temp-Hi-Pressure-Chem-App-17 with the selected software.

In particular embodiments, the software-selection process 240-2 may transmit an activation signal to a wireless sensor (either conventional or programmable) and in response to transmitting the activation signal, the software-selection process 240-2 may receive input indicating operating characteristics of the wireless sensor. The software-selection process 240-2 receives this input and can use this input to select software that, when executed on a programmable wireless sensor 100, programs the programmable wireless sensor 100 to emulate the wireless sensor to which the activation signal was transmitted. In one example, the software-selection process 240-2 may transmit a plurality of activation signals of different frequency and modulation, for example, until an activation signal activates the wireless sensor. The frequency and modulation of the activation signal that successfully activates the wireless sensor are operating characteristics of the wireless sensor and the software-selection process 240-2 can use these operating characteristics to select software for programming the programmable wireless sensor 100 to emulate the wireless sensor. Similarly, the frequency and modulation of the signal transmitted by the wireless sensor after being activated are operating characteristics that the software-selection process 240-2 can use to select software for programming the programmable wireless sensor 100 to emulate the wireless sensor. Additionally, many activated wireless sensors transmit a unique identifier when activated. A software-selection process 240-2 may receive this identifier and use this identifier to determine operating characteristics of the wireless sensor. For example, the software-selection process 240-2 may determine the model number of the wireless sensor from the unique identifier and the model number can be used to determine the wireless sensor's operating characteristics.

In step 320, the software-selection process 240-2 responds to receiving the input related to wireless sensors. In responding to the received input, the software-selection process 240-2 may perform step 322, selecting software encoded in one or more computer-readable media and, when executed, operable to program at least one operating characteristic of a programmable wireless sensor. The software-selection process 240-2 will generally have access to a collection or library of software routines, modules, or programs, etc. that can be transmitted to the programmable wireless sensors to program the at least one operating characteristics. The software collection may be stored, for example, in one or more databases on one or more servers accessible via the communications interface 215 and communication link 220. The selected software may be selected from this software collection. As is known in database technology, the software may be categorized based on the operating characteristics that the stored software programs. The software can be stored so that a user can retrieve the software by desired category.

In particular embodiments, the software-selection process 240-2 may perform step 324. In step 324, the software-selection process 240-2 may transfer selected software to a device adapted to transmit the selected software to a programmable wireless sensor. The software-selection process 240-2 may transfer the selected software to the device wirelessly or non-wirelessly, such as through a USB connection. In particular embodiments, this device may be a device, such as a handheld programming tool, that can be used to store the selected software and transmit a copy of the selected software to the programmable wireless sensor 100. The handheld tool can be used to program or reprogram multiple programmable wireless sensors, such as all the programmable wireless sensors 100 intended to emulate a particular conventional TPMS sensor on one or more vehicles. In other embodiments, this device may be a communications device, such as a USB port or a transmitter, that allows the computing environment 200 to transmit the selected software to the programmable wireless sensor 100. This communications device may be part of the communications interface 215, for example.

In particular embodiments, the software-selection process 240-2 may perform step 326. In step 326, the software-selection process 240-2 transmits selected software to a programmable wireless sensor. The software-selection process 240-2 may transmit the selected software to the programmable wireless sensor wirelessly or non-wirelessly, such as through a USB connection.

In accordance with embodiments described herein, programmable wireless sensors as well as techniques and apparatus usable with the programmable wireless sensors have been provided. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to be limiting. Rather, the scope of the inventive matter should be assessed as that of the appended claims and by equivalents thereto.

What is claimed is:

1. A method comprising:
   at a computer system, receiving input related to a particular wireless sensor; and
   in response to receiving the input related to the particular wireless sensor, selecting software encoded in one or more computer-readable media that, when executed, is operable to program at least one operating characteristic of a programmable wireless sensor to substantially emulate the particular wireless sensor.

2. The method of claim 1, wherein receiving the input related to the particular wireless sensor comprises receiving an identifier of the particular wireless sensor to be substantially emulated upon execution of the software in the programmable wireless sensor.

3. The method of claim 1, wherein receiving the input related to the wireless sensor comprises receiving an indication of the at least one operating characteristic to be programmed upon execution of the selected software.

4. The method of claim 3, wherein the at least one operating characteristic includes a transmission frequency and a transmission modulation.

5. The method of claim 1, further comprising:
   transmitting an activation signal from the computer system to the particular wireless sensor; and
   at the computer system, receiving the input from the particular wireless sensor in response to transmitting the activation signal.

6. The method of claim 5, wherein the particular wireless sensor is located in a vehicle tire.

7. The method of claim 1, wherein responding to receiving the input related to the particular wireless sensor further comprises transferring the selected software to a device adapted to wirelessly transmit the selected software to the programmable wireless sensor.

8. The method of claim 1, wherein responding to receiving the input related to the particular wireless sensor further comprises wirelessly transmitting the selected software from the computer system to the programmable wireless sensor.

9. The method of claim 8, wherein the programmable wireless sensor is located in a vehicle tire.

10. Software encoded in one or more computer-readable media and, when executed, operable to:
    at a computer system, receive input related to a particular wireless sensor; and
    in response to receiving the input related to the particular wireless sensor, select software encoded in one or more computer-readable media that, when executed, is operable to program at least one operating characteristic of a programmable wireless sensor to substantially emulate the particular wireless sensor.

11. The software of claim 10, wherein receiving input related to the particular wireless sensor comprises receiving an identifier of the particular wireless sensor to be substantially emulated upon execution of the software in the programmable wireless sensor.

12. The software of claim 10, wherein receiving the input related to the particular wireless sensor comprises receiving an indication of the at least one operating characteristic to be programmed upon execution of the selected software.

13. The software of claim 10, wherein the software is further operable to:
    transmit an activation signal from the computer system to the particular wireless sensor; and
    at the computer system, receive the input from the particular wireless sensor in response to transmitting the activation signal.

14. The software of claim 10, wherein responding to receiving the input related to the particular wireless sensor further comprises transferring the selected software to a device adapted to wirelessly transmit the selected software to the programmable wireless sensor.

15. The software of claim 10, wherein responding to receiving the input related to the particular wireless sensor further comprises wirelessly transmitting the selected software from the computer system to the programmable wireless sensor.

16. A computer system comprising:
    a processor;
    a memory component that stores instructions associated with an application executed by the processor; and
    an interconnect coupling the processor and the memory unit, enabling the computer system to execute the application and perform operations of:
        at the computer system, receiving input related to a particular wireless sensor; and
        in response to receiving the input related to the particular wireless sensor, selecting software encoded in one or more computer-readable media that, when executed, is operable to program at least one operating characteristic of a programmable wireless sensor to substantially emulate the particular wireless sensor.

17. The computer system of claim 16, wherein receiving input related to the particular wireless sensor comprises receiving an identifier of the particular wireless sensor to be substantially emulated upon execution of the software in the programmable wireless sensor.

18. The computer system of claim 16, wherein receiving the input related to the particular wireless sensor comprises receiving an indication of the at least one operating characteristic to be programmed upon execution of the selected software.

19. The computer system of claim 16, further enabled to perform operations of:
    transmitting an activation signal from the computer system to the particulare wireless sensor; and
    at the computer system, receiving the input from the particular wireless sensor in response to transmitting the activation signal.

20. The computer system of claim 16, wherein responding to receiving the input related to the particular wireless further comprises transferring the selected software to a device adapted to wirelessly transmit the selected software to the programmable wireless sensor.

21. The computer system of claim 16, wherein responding to receiving the input related to the particular wireless sensor further comprises wirelessly transmitting the selected software from the computer system to the programmable wireless sensor.

* * * * *